(12) United States Patent
Funakura et al.

(10) Patent No.: US 6,314,946 B1
(45) Date of Patent: Nov. 13, 2001

(54) FUEL INJECTION SYSTEM FOR DIESEL ENGINES

(75) Inventors: Kazuki Funakura; Shinichi Nakanishi, both of Kawasaki (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/125,731

(22) PCT Filed: Jan. 16, 1998

(86) PCT No.: PCT/JP98/00134

§ 371 Date: Aug. 25, 1998

§ 102(e) Date: Aug. 25, 1998

(87) PCT Pub. No.: WO98/31932

PCT Pub. Date: Jul. 23, 1998

(30) Foreign Application Priority Data

Jan. 16, 1997 (JP) .................................... 9-005657

(51) Int. Cl.[7] .................................................. F02M 37/04
(52) U.S. Cl. ............................................. 123/509; 123/456
(58) Field of Search .................................. 123/468, 469, 123/470, 509, 456

(56) References Cited

U.S. PATENT DOCUMENTS

| | | | |
|---|---|---|---|
| 2,892,453 | * | 6/1959 | Stoll ........................................ 123/452 |
| 3,026,928 | * | 3/1962 | Phillips .................................... 123/456 |
| 3,783,842 | * | 1/1974 | Kuhn ........................................ 123/469 |
| 4,570,602 | * | 2/1986 | Atkins ...................................... 123/456 |
| 5,022,371 | * | 6/1991 | Daly ......................................... 123/468 |
| 5,398,658 | * | 3/1995 | Mesimaki ................................. 123/509 |
| 5,408,971 | * | 4/1995 | Jeager ...................................... 123/456 |
| 5,411,001 | * | 5/1995 | Werner .................................... 123/456 |
| 5,482,021 | * | 1/1996 | Roche ...................................... 123/456 |

FOREIGN PATENT DOCUMENTS 10-37756 * 2/1998 (JP) .

* cited by examiner

*Primary Examiner*—Carl S. Miller
(74) *Attorney, Agent, or Firm*—Staas & Halsey LLP

(57) ABSTRACT

A fuel injection system for a Diesel engine, which is able to have a small space, a reduced number of parts, a light weight and an excellent maintainability by arranging such a common rail that eliminates the bracket structures for the common rail and the fuel feed pump and makes the fuel pipes short. The fuel injection system is constructed such that a common rail is mounted on a cylinder body, and such that a fuel feed pump is mounted to overlie said common rail, so that a fuel to be pumped by said fuel feed pump is injected into the combustion chambers of cylinders after it has been accumulated by the common rail.

7 Claims, 3 Drawing Sheets

FUEL INJECTION SYSTEM FOR DIESEL ENGINES

TECHNICAL FIELD

The present invention relates to a fuel injection in a Diesel engine and to a fuel injection system for a Diesel engine, for injecting a fuel into the combustion chamber of the engine by employing a common rail.

BACKGROUND ART

In the Diesel engine, there is adopted as one fuel injection system a common rail system which has an integral construction of an injection pump and a nozzle and which uses a fuel injection nozzle (or unit injector) mounted for each cylinder on a cylinder head so that a fuel under a relatively high pressure is accumulated in a common rail acting as a pressure chamber and is boosted to a higher level by a pressure intensifying piston constituting a fuel injection pump and injected by the fuel injection nozzle.

In this common rail system, as shown in FIG. 3, the fuel in a fuel tank 11 is boosted by a fuel feed pump 3 to a pressure level, which is controlled by a pressure control valve 10 controlled by a controller 13, and is stored in a common rail 4 acting as an accumulator. The fuel in this common rail 4 is injected through fuel pipes 5 and solenoid valves 14 into combustion chambers 15 by fuel injection nozzles 6. The quantities and timings of the fuel injections are adjusted by turning ON/OFF the solenoid valves 14 by the controller 13 which receives signals from a variety of sensors 12.

In this case, all the fuel pipes 5 for connecting the discharge ports 7 of the common rail 4 and the fuel injection nozzles 6 have to be given equal lengths so as to prevent dispersion in the pressure responses among the fuel injection nozzles 6, i.e., to prevent the fuel injection timings from going out order.

In the fuel injection system of the common rail system of the prior art, however, the fuel feed pump and the common rail 4 are arranged not with any overlap but planarly on the upper face of the cylinder body 2, as seen from top plan views of an engine 1 shown in FIGS. 4 and 5.

Since the fuel pipes 5 connecting the common rail 4 and the fuel injection nozzles 6 have to be arranged to bypass the fuel feed pump 3, therefore, they have long and different lengths.

In order to feed the fuel under a constant pressure to the fuel injection nozzles 6, on the other hand, each fuel pipe 5 has to be extended to have the longest length so as to make the pressure losses and responses uniform. This necessity elongates the fuel pipes 5 as a whole to complicate the assembling and repairing works. Since the whole lengths of the fuel pipes 5 from the common rail 4 acting as a pressure source to the fuel injection nozzles 6 are increased, moreover, there arises a problem that the responsiveness to the injection pressure is accordingly degraded.

These fuel pipes 5 have to be made of thick and strong metal pipes sufficient for enduring high pressure and vibration so that they are arranged on the vibrating engine 1 to feed the fuel under the high pressure. If the fuel pipes 5 are elongated for that reason, there arises a problem that the fuel pipes 5 provides an unnegligible increase in their total weight.

For these reasons, the fuel pipes 5 between the common rail 4 and the fuel injection nozzles 6 to be used have to be as short as possible for lightening the engine.

In the method for mounting the common rail 4 and the fuel feed pump 3, moreover, there are individually required the brackets for mounting the fuel feed pump 3 on a cylinder body 2 and the brackets for mounting the common rail 4 on the cylinder body 2. This necessity also raises a problem that it causes an increase in the engine weight.

The invention has been conceived to solve the above-specified problems with the engine of the prior art, and has an object to provide a fuel injection system for a Diesel engine, which is enabled to have a small space, a reduced number of parts, a light weight and an excellent reparability by arranging such a common rail as eliminates the bracket structures for the common rail and the fuel feed pump and as makes the fuel pipes short as a whole.

DISCLOSURE OF INVENTION

In order to achieve the object, according to the invention, there is provided a fuel injection system for a Diesel engine, constructed such that a common rail is mounted on a cylinder body, and such that a fuel feed pump is mounted to overlie said common rail, so that a fuel to be pumped by said fuel feed pump is injected into the combustion chambers of cylinders after it was accumulated by the common rail.

Moreover, said common rail is arranged at the center in the longitudinal direction of said engine. Then, the longest distance between the individual discharge ports of the common rail and the fuel injection nozzles arranged at the combustion chambers of the individual cylinders can be reduced to shorten the fuel pipes conforming to that longest distance.

When said Diesel engine is a V-type engine, still moreover, the piping can be made symmetric not only in the longitudinal direction but also in the transverse direction so that the symmetric fuel pipes can be increased to reduce the number of parts.

BEST MODE FOR CARRYING OUT THE INVENTION

Figure 1A:
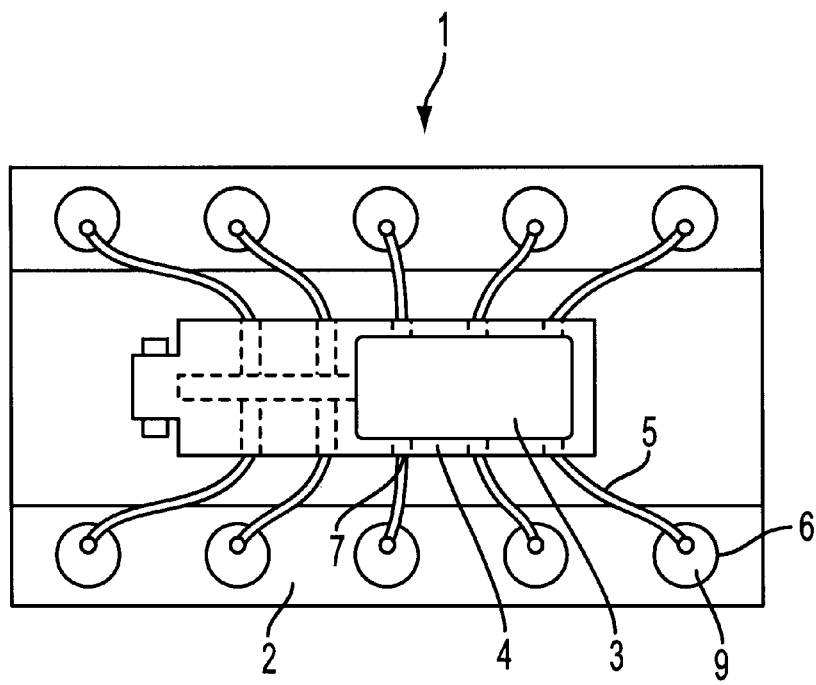
FIG. 1 presents schematic construction diagrams of a common rail system according to an embodiment of the invention, and the diagram (a) is a top plan view whereas the diagram (b) is a front elevation.
Figure 1B:
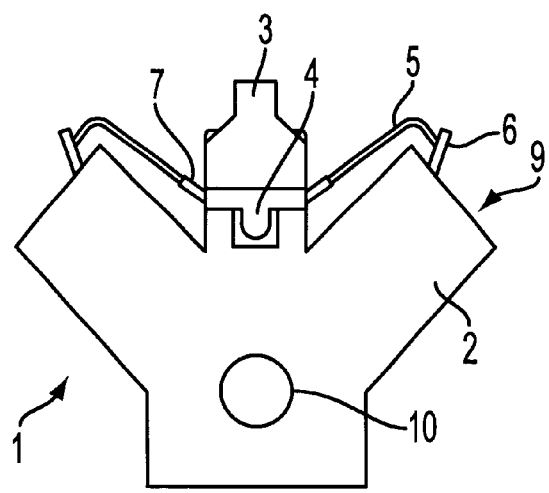
Figure 2:
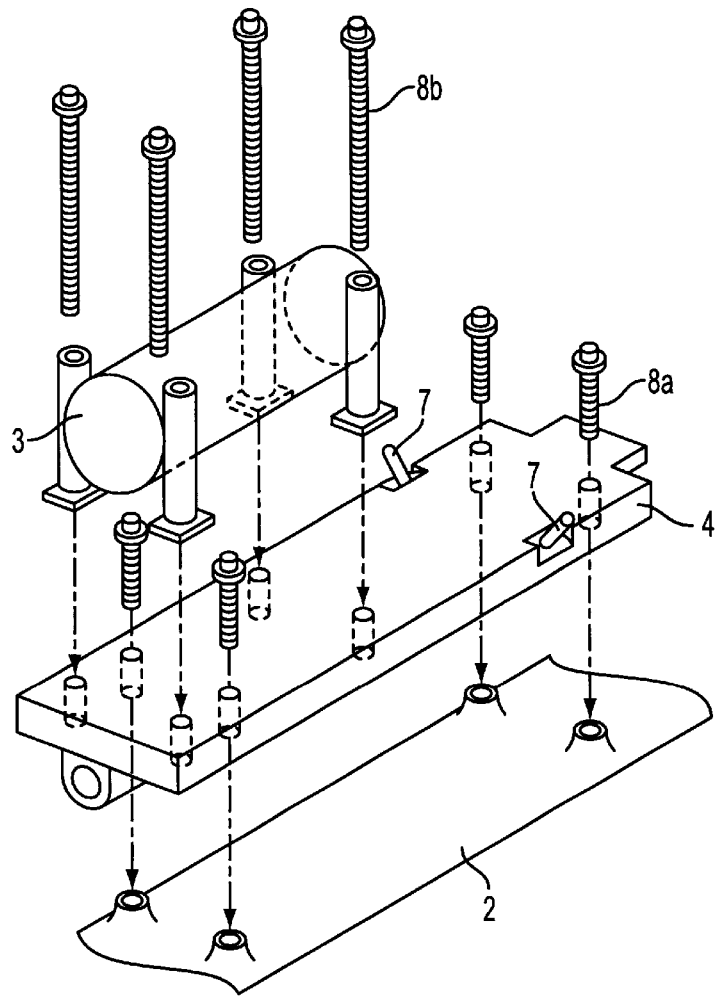
FIG. 2 is an assembly explaining diagram showing the mounting of a common rail and a fuel feed pump in the embodiment of the invention.
Figure 3:
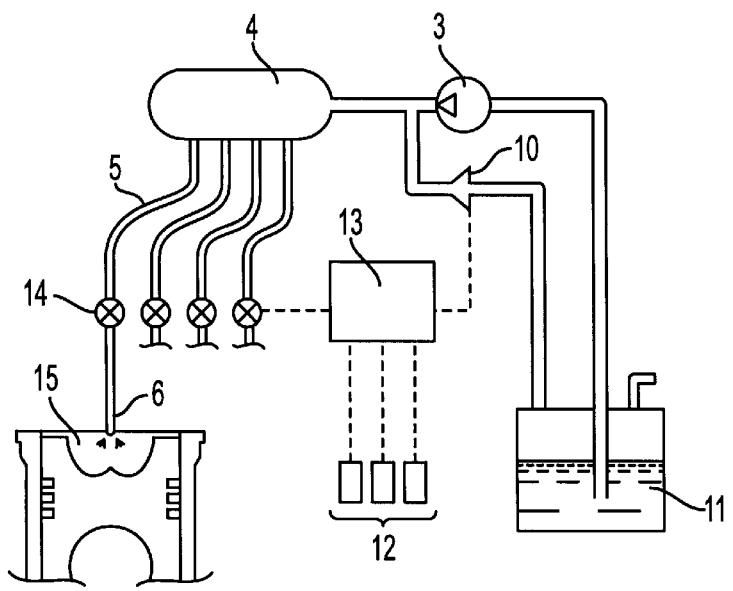
FIG. 3 is a construction diagram showing the common rail system schematically.
Figure 4:
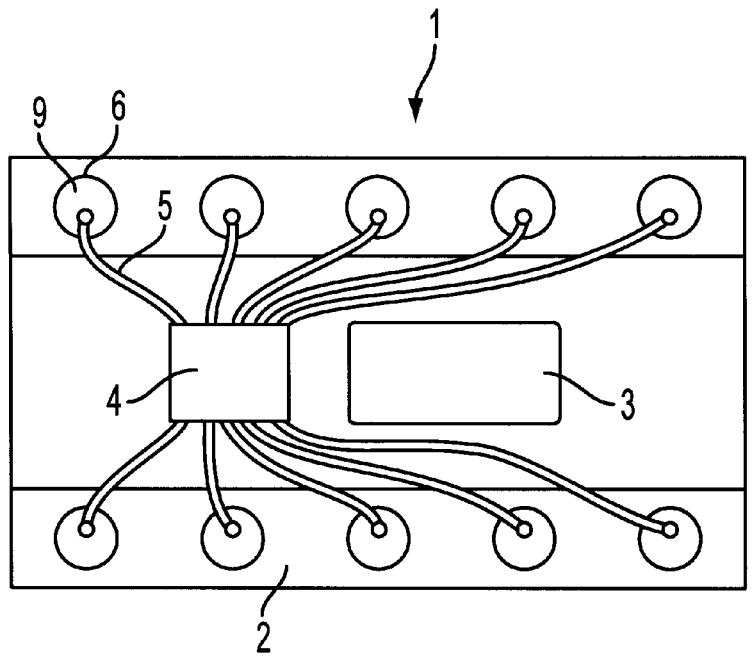
FIG. 4 is a schematic diagram showing an example of the common rail system of the prior art.
Figure 5:
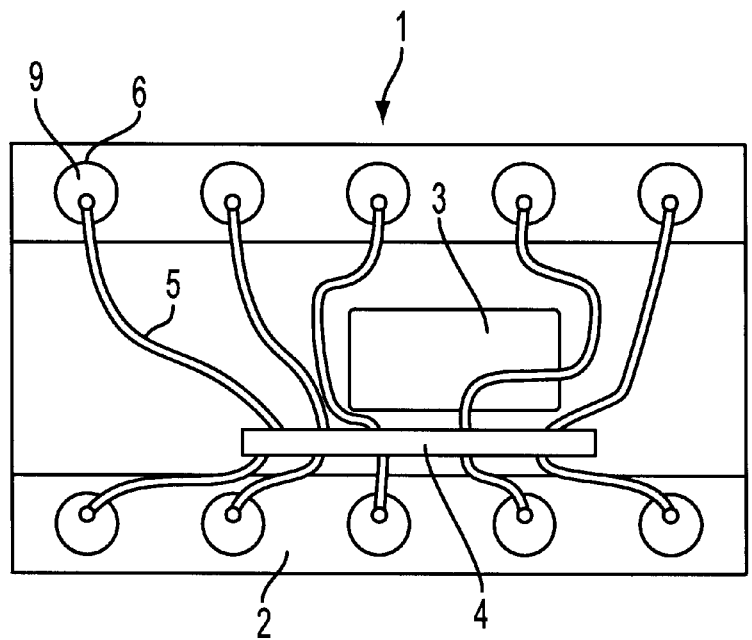
FIG. 5 is a schematic diagram showing another example of the common rail system of the prior art.

As shown in FIGS. 1 and 2, a fuel injection system for a Diesel engine of the invention is assembled in a multi-layer structure by mounting a common rail 4 on a cylinder body 2 by mounting bolts 8a and by mounting a fuel feed pump 3 for pumping a fuel to the engine on the common rail 4 by mounting bolts 8b. Moreover, the fuel to be pumped by the fuel pump 3 is fed to individual fuel injection nozzles 6, after accumulated by the common rail 4, so that it is injected into combustion chambers 15 in the upper portions of the individual cylinders.

As a result, no bracket has to be used for mounting the common rail 4 on the cylinder body 2, but the common rail 4 is mounted directly on the cylinder body 2. Moreover, the fuel feed pump 3 is fixed on the common rail 4 so that this common rail 4 itself acts as the brackets for mounting the fuel feed pump 3.

On the other hand, the common rail 4 can be equipped, if necessary, with a pressure controlling limiter, a temperature sensor and a pressure sensor, although not shown.

In order to avoid complexity, in FIG. 2, there are shown only two discharge ports 7 which lead from the common rail 4 to the fuel injection nozzles 6, and there are omitted the pipes between the fuel feed pump 3 and the common rail 4. It is, however, natural to provide the discharge ports 7 in a number corresponding to the cylinder number and to provide the pipes between the fuel feed pump 3 and the common rail 4. Although schematically shown, on the other hand, the fuel feed pump 3 is equipped with a coupling mechanism, as located at the longitudinal end part thereof, that is, at this side of FIG. 2, for receiving a drive force from the crankshaft. Moreover, the common rail 4 is arranged at a position to reduce the longest distance of the piping between the discharge ports 7 and the fuel injection nozzles 6 which are mounted in the combustion chambers in the upper portions of cylinders 9. Specifically, the common rail 4 is arranged at the center portion in the longitudinal direction of the engine 1.

In case the Diesel engine or the subject of the invention is exemplified by a V-type engine, as shown in FIGS. 1 and 2, the common rail 4 is arranged at the center portion in the longitudinal direction of the engine 1 and at the center portion of the V-bank, i.e., at the center portion in the widthwise direction of the cylinder block. With this construction, fuel pipes 5 are made symmetric not only in the longitudinal direction but also in the widthwise direction so that the number of fuel pipes to be commonly used can be increased to reduce the number of parts of the engine 1 drastically.

According to the construction thus far described, the common rail 4 is mounted directly on the cylinder body 2, and the fuel feed pump 3 is mounted on the common rail 4 by making use of the common rail 4 itself as the brackets of the fuel feed pump 3. As a result, it is possible to omit the brackets for both the common rail 4 and the fuel feed pump 3.

As a result, it is possible to simplify the works for mounting the common rail 4 and the fuel feed pump 3 on the cylinder body 2 and the repairing works thereby to improve the assembling and repairing works of an engine 1. Since no bracket is required, as described above, it is possible to lighten the weight of the engine 1 and to reduce the number of parts.

By arranging the common rail 4 at the center in the longitudinal direction of the engine 1, moreover, the longest distance of the fuel injection nozzles 6 between the individual discharge ports 7 of the common rail 4 and the fuel injection nozzles 6 at the combustion chambers in the upper portions of the individual cylinders 9 can be shortened to make the whole length of the fuel pipes 5, as arranged according to the longest distance, far shorter than that of the engine of the prior art. As a result, it is possible to improve the responsiveness of the fuel injection nozzles and to lighten the total weight of the fuel pipes 5.

Since the fuel pipes to be arranged in the symmetric positions over the cylinder body 2 can be used commonly, moreover, it is possible to reduce the number of parts of the engine 1.

Since the distance between a crankshaft 10 and the fuel feed pump 3 depends upon the gear ratio, as determined by the RPM of the engine 1 and the RPM of the fuel feed pump 3, and the sizes of the gears, on the other hand, the structure is liable to leave a space between the fuel feed pump 3 and the cylinder body 2. According to the invention, the common rail 4 can be arranged in that space so that the space can be effectively utilized.

This construction exhibits a prominent effect especially in the case where the subject Diesel engine is of the V-type engine, but can also effect similar effect in a straight type engine.

INDUSTRIAL APPLICABILITY

According to the invention, as has been described hereinbefore, there is provided the structure in which the common rail is mounted directly on the cylinder body and in which the fuel feed pump is mounted on the common rail by using the common rail itself as the brackets for the fuel feed pump. As a result, the fuel pipes connecting the common rail and the fuel injection nozzles can be freely arranged without being obstructed by the fuel feed pump, and the longest fuel pipe can be shortened to improve the responsiveness of the fuel injection.

Since the brackets are required neither for the common rail nor for the fuel feed pump, on the other hand, it is possible to improve the mounting and repairing efficiencies and to reduce the number of parts and the weight of the engine.

Since the common rail is arranged at the center in the longitudinal direction of the engine, on the other hand, the whole length of the fuel pipes can be shortened to improve the responsiveness of the fuel injection nozzles. In addition, the total weight of the fuel pipes can be reduced to reduce the weight of the engine.

Since the fuel pipes at the symmetric positions can be used commonly, moreover, it is possible to reduce the number of parts of the engine.

What is claimed is:

1. A fuel injection system for a Diesel engine, comprising:
   a common rail mounted on a cylinder body, said common rail having a longitudinal axis, and
   a fuel feed pump having a longitudinal axis, mounted to overlie said common rail such that the longitudinal axis of said common rail directly overlies the longitudinal axis of said fuel feed pump, so that fuel to be pumped by said fuel feed pump is injected into combustion chambers of cylinders after the fuel has been accumulated in the common rail.

2. A fuel injection system for a Diesel engine as set forth in claim 1, wherein said common rail is arranged at the center in the longitudinal direction of said engine.

3. A fuel injection system for a Diesel engine as set forth in claim 1, wherein said Diesel engine is a V-type engine.

4. A fuel injection system for a Diesel engine, comprising:
   a common rail for accumulating fuel from a fuel tank to be injected into combustion chambers of cylinders in an engine body, said common rail having a longitudinal axis; and a fuel feed pump having a longitudinal axis mounted on a top surface of said common rail such that the longitudinal axis of said common rail directly overlies the longitudinal axis of said fuel feed pump, to maintain fuel pressure in said common rail substantially constant by pumping fuel from said fuel tank into said common rail.

5. A common rail fuel injection system; comprising:

a common rail that accumulates fuel from a fuel tank, said common rail being positioned in a substantially central top area of an engine, said common rail having a longitudinal axis;

a plurality of fuel pipes connecting said common rail to a plurality of cylinders of said engine; and a fuel feed pump having a longitudinal axis positioned on a top surface of said common rail such that the longitudinal axis of said common rail directly overlies the longitudinal axis of the said fuel feed pump, so as to minimize a length of each of the plurality of fuel pipes.

6. A method for shortening fuel pipes in a fuel injection system that are positioned between a common rail and cylinders of an engine, comprising:

mounting a common rail having a longitudinal axis in a substantially central top area of an engine body;

mounting a fuel feed pump having a longitudinal axis on a top surface of said common rail such that the longitudinal axis of said common rail directly overlies the longitudinal axis of said fuel feed pump; and connecting said common rail to cylinders of the engine body with the fuel pipes.

7. A fuel injection system for a diesel engine, comprising:

a common rail, said common rail having a longitudinal axis;

a fuel pump having a longitudinal axis overlying said common rail such that the longitudinal axis of said common rail directly overlies the longitudinal axis of said fuel feed pump, to pump fuel to said common rail; and a plurality of cylinders connected to said common rail by a plurality of fuel pipes, wherein fuel from said common rail is injected into said cylinders.

* * * * *